(12) United States Patent
Steele et al.

(10) Patent No.: US 10,513,228 B2
(45) Date of Patent: Dec. 24, 2019

(54) SELF FIXTURING SIDEPACK CABINETS FOR UTILITY TRUCK BODY

(71) Applicant: The Knapheide Manufacturing Company, Quincy, IL (US)

(72) Inventors: Justin Steele, Quincy, IL (US); Richard Baze, Quincy, IL (US); Lance Jones, Quincy, IL (US); Mark Rose, Quincy, IL (US)

(*) Notice: Subject to any disclaimer, the term of this patent is extended or adjusted under 35 U.S.C. 154(b) by 5 days.

(21) Appl. No.: 15/918,049

(22) Filed: Mar. 12, 2018

(65) Prior Publication Data

US 2019/0275951 A1 Sep. 12, 2019

(51) Int. Cl.
*B60R 9/06* (2006.01)
*E06B 1/52* (2006.01)
*B62D 65/02* (2006.01)

(52) U.S. Cl.
CPC .............. *B60R 9/06* (2013.01); *B62D 65/024* (2013.01); *E06B 1/52* (2013.01)

(58) Field of Classification Search
CPC ......... A47B 47/00; A47B 47/02; A47B 47/03; A47B 47/0025; A47B 47/0091; A47F 3/0426; A47F 3/043; B60R 9/06; B60R 9/065; B62D 65/024; E06B 1/52
See application file for complete search history.

(56) References Cited

U.S. PATENT DOCUMENTS

| | | | | |
|---|---|---|---|---|
| 2,978,153 A * | 4/1961 | Brindle | ..................... | B60R 9/02 224/541 |
| 4,288,132 A * | 9/1981 | Znamirowski | ......... | A47B 47/03 248/205.3 |
| 4,836,626 A * | 6/1989 | Taylor | ..................... | A47B 47/03 312/257.1 |
| 5,845,952 A * | 12/1998 | Albertini | ................... | B60P 3/14 296/37.6 |
| 6,422,612 B1 * | 7/2002 | Hays | ................... | E05B 17/2046 292/5 |
| 6,789,859 B1 * | 9/2004 | Ho | ......................... | A47B 47/02 312/257.1 |
| 6,941,654 B1 * | 9/2005 | Sears | ....................... | B21D 5/00 29/897.2 |
| 6,955,385 B1 * | 10/2005 | Boyer | .................... | B62D 33/02 296/37.6 |
| 7,784,887 B2 * | 8/2010 | Grela | ..................... | B25H 3/028 312/218 |
| 2015/0250332 A1 * | 9/2015 | Mille | .................... | A47F 3/0404 62/255 |
| 2017/0150636 A1 * | 5/2017 | Segroves | ............. | H05K 7/1489 |
| 2017/0349108 A1 * | 12/2017 | Spahn | ....................... | B60R 9/06 |

* cited by examiner

*Primary Examiner* — Corey N Skurdal
(74) *Attorney, Agent, or Firm* — QPatents

(57) ABSTRACT

A self fixturing sidepack cabinet for a utility truck body has right and left doorjamb components that are positioned to the right and left of the cabinet door in the closed position. The door closes against door stop components positioned around the doorjamb, and extending inward. The door stop components may have a flexible edging component fitted on them around the doorway. The top door stop component extends from an upper door frame component configured with tabs bent 90 degrees from the door stop surface. The tabs slide behind the left and right doorjamb components to ensure the top of the door opening is dimensionally correct and installed at the proper angles.

20 Claims, 6 Drawing Sheets

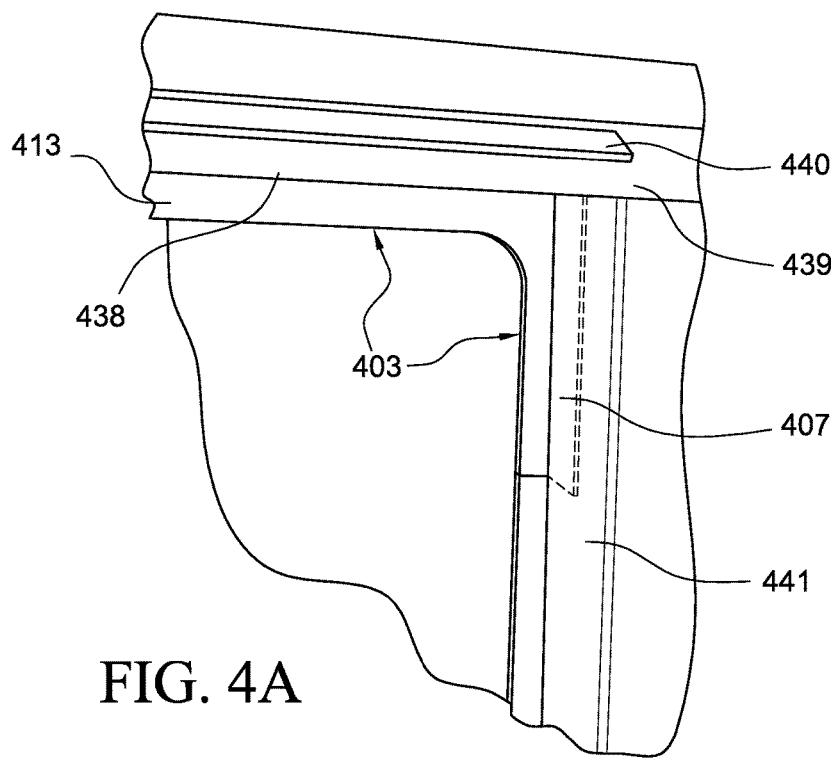
FIG. 4A
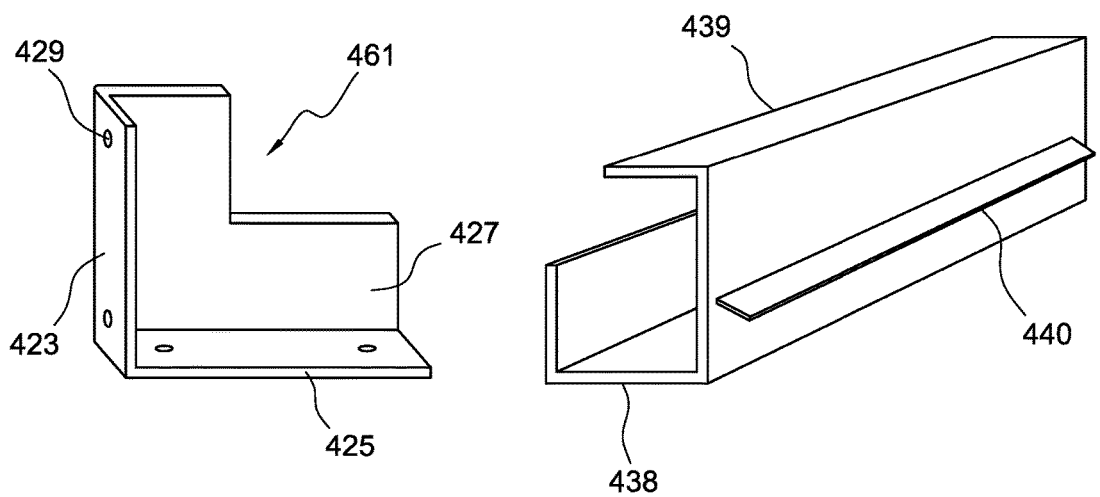
FIG. 4C
FIG. 4B

SELF FIXTURING SIDEPACK CABINETS FOR UTILITY TRUCK BODY

BACKGROUND

Technical Field

Various embodiments of the present invention relate to component parts for vehicle mounted tool enclosures, and more specifically, to self fixturing tool cabinets mounted on utility trucks.

Description of Related Art

Construction and maintenance crews often need to transport tools and equipment to and from job sites. Tools and equipment left out in the open tend to get lost or stolen if left in the bed of a utility truck or a pickup truck. To prevent loss of tools and equipment construction and maintenance crews use conventional tool cabinets attached to the truck's frame. Such tool cabinets are useful for storing tools and equipment and help to prevent theft and loss. Further, truck mounted tool cabinets aid in organizing the tools and equipment so that they can easily be located once the truck reaches the job site. Upon completion of the job, workers putting the tools and equipment away in an organized truck mounted tool cabinet are more likely to notice a missing tool than if the tools and equipment are simply placed in containers in the back of the truck box.

For convenience the tool cabinets of utility trucks are mounted along the sides of the truck body with doors that open outward. In this way, workers can easily and conveniently access the cabinets while standing beside the utility truck—without need to climb into the bed of the truck, or go into the back of an enclosed truck. Further, mounting the cabinets along the sides of the truck helps to maximize the cabinet access area. There's more area to fit cabinet doors around the outside of the truck body than on the inside or the top of the cabinets.

Conventional truck mounted tool cabinets are often made of components that are welded and bolted together. Such convention fabrication techniques tend to produce a very sturdy tool cabinet. However, the assembly and manufacturing of conventional truck mounted tool cabinets is very labor intensive—taking as much as five hours or more of assembly and manufacturing time per utility truck.

BRIEF SUMMARY

The present inventors recognized certain drawbacks and disadvantages of conventional truck mounted tool cabinets, including for example, the labor costs for assembly and adjustment of conventional truck mounted tool cabinets. The various embodiments disclosed herein overcome these drawbacks and disadvantages. The various embodiments disclosed herein are drawn to a truck body sidepack tool cabinet with a cabinet door frame configured to receive a cabinet door. The cabinet door frame includes a right doorjamb beam, a left doorjamb beam, an upper frame component and a lower frame component. The doorway has stop pieces that extend inward from the doorjambs and the upper and lower frame components. The door closes on the stop pieces or stop surfaces. In some embodiments the stop surfaces have a flexible edging component fitted on them around the doorway to cushion the door as it closes on the stop surfaces. The upper frame component is attached to the outer sides of the right and left doorjamb beams. The upper frame component has arms that extend downward several inches on each side of the door. Similarly, the lower frame component has arms that extend upward several inches on each side of the door. The bottom edges of upper frame component arms rest on the top edge of the side stop pieces (surfaces). Similarly, the top edges of lower frame component arms are positioned to receive the bottom edges side stop pieces.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings:

FIG. 4A is a front view of an open cabinet door depicting the assembled components of the door frame according to various embodiments disclosed herein.

FIG. 4B depicts an oblique view of a top rail according to various embodiments disclosed herein.

FIG. 4C depicts an oblique view of a corner gusset according to various embodiments disclosed herein.

DETAILED DESCRIPTION

The present inventors recognized certain drawbacks and disadvantages of conventional tool cabinet construction. One significant disadvantage is due to the labor costs of manufacturing conventional truck mounted tool cabinets. The various embodiments disclosed herein require on the order of 50% less labor time for manufacturing in comparison to the manufacturing time for conventional truck mounted tool cabinets. Moreover, the various embodiments have no welds (or in some embodiments, only a few welds) rather than being welded at nearly every seam as is done in the manufacturing of conventional truck mounted tool cabinets. The novel assembly methods used in the various embodiments and elimination of welding has significantly reduced assembly and manufacturing cost as compared to conventional truck mounted tool cabinets.

Figure 1A:
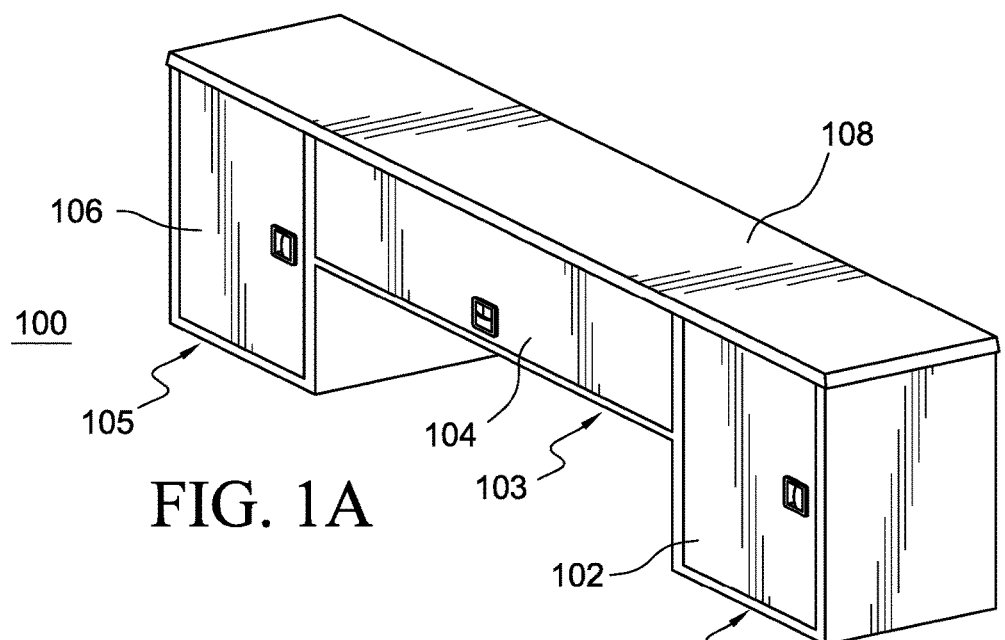
FIGS. 1A-B depict front side oblique views of an assembled tool cabinet sidepack and a partially assembled tool cabinet sidepack, respectively, for a utility truck body according to various embodiments disclosed herein.

FIG. 1A depicts a front side oblique view of an assembled tool cabinet sidepack for a utility truck body according to various embodiments disclosed herein. The cabinet sidepack 100 is configured to be mounted on a utility truck frame with the front cabinet assembly 101 positioned just behind the cab of the truck. The cabinet sidepack 100 is positioned on the truck frame so that the space 107 beneath horizontal subassembly 131 traverses the tire and wheel of the truck. A wheel well may be affixed within the space 107 beneath horizontal subassembly 131.

The tool cabinet of FIG. 1A has hinged cabinet doors 102, 104 and 106 that cover the three main compartments. The three hinged doors 102, 104 and 106 are configured to swing outward for ease of access to a user standing beside the utility truck. For example, in the embodiment shown in the figure cabinet doors 102 and 106 are hinged on the side to swing outward, and cabinet door 104 is hinged on the bottom edge to swing outward and down, to serve as a shelf of sorts for the user. In other embodiments cabinet door 104 is hinged on the top edge to swing outward and up. In other embodiments, each of the cabinets may be provided with two or more doors, and may be configured with hinges on the top, bottom or either side. For example, the end tool cabinets 101 and 105 in may each be equipped with double doors that swing outward. The center tool cabinet 103 may be provided with two or more doors configured to open either up or down, and/or may have hinges on the sides and swing out from the right or left. The tool cabinets 101, 103 and 105 could possibly become slightly skewed during assembly. The top cover 108, which covers the entire assembled tool cabinet sidepack 100, is constructed to be rectangular in the horizontal plane. Fastening the top cover 108 onto the assembly ensures the horizontal squareness of the assembled sidepack. That is, fastening the top cover 108 onto the assembly ensures that the corners of the assembled sidepack are square as viewed looking down from a top view.

Figure 1B:
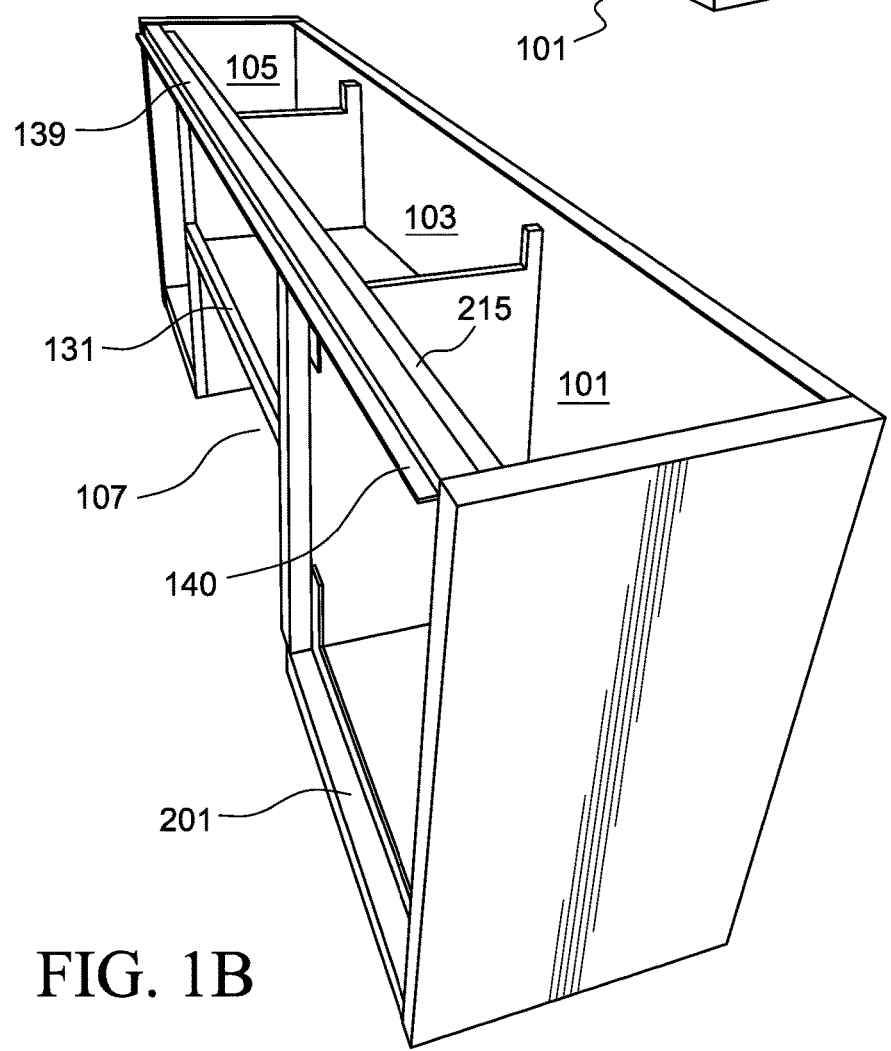

FIG. 1B depicts the front side oblique view of a partially assembled tool cabinet sidepack for a utility truck body according to various embodiments disclosed herein. The rear cabinet assembly 105 and the front cabinet assembly 101 are connected by a top rail 139 and horizontal subassembly 131. The top rail 139 is oriented horizontally with respect to the assembled cabinet sidepack 100, spanning the length of the cabinets in the assembly. The top rail 139 aids in defining the correct length of the assembly. The top rail 139, depicted in FIG. 1B, aids in tying the front and back sidepack tool cabinets together and provides structural strength for the overall assembly. The top rail 139 spans the length (or nearly the length) of the cabinets beyond the outer edges of the cabinet doors of sidepack 100. The top rail 139 has a drip ledge 440 that extends out over the cabinet doors to help keep moisture from getting into the spaces above the cabinet doors 102-106. FIG. 113 also shows the lower frame component 201, the details of which are depicted in FIGS. 2A-C.

The cabinet sidepack 100 embodiment depicted in FIGS. 1A-B has three cabinets, 101, 103 and 105. Other embodiments may be configured with more tool cabinets. By using the proper length top rail 139 and top cover 108 a sidepack assembly may be configured with two or more cabinets up to the number of cabinets that will fit on a particular vehicle frame. For example, a multi-axle truck with a lengthy frame could be fitted with a sidepack assembly comprising ten or more tool cabinets.

Figure 2A:
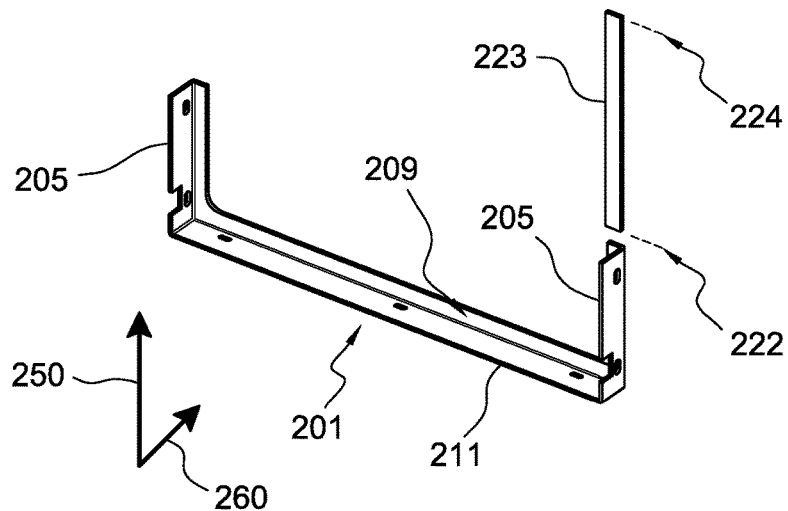
FIGS. 2A-B depicts oblique views of the upper and lower frame stop components, according to various embodiments disclosed herein.
Figure 2B:
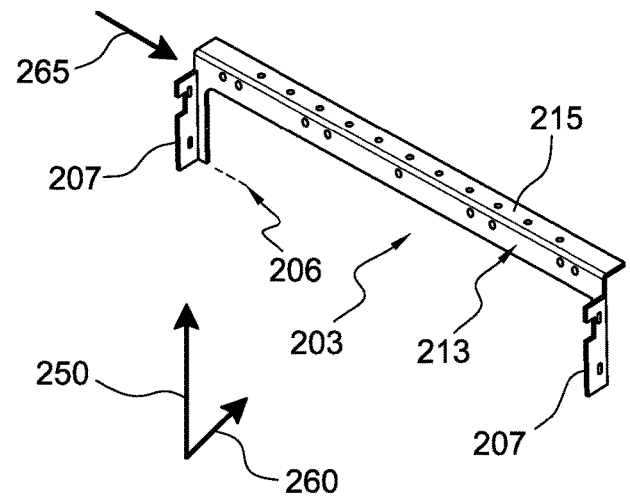

FIGS. 2A-B depict oblique views of lower frame component 201, upper frame component 203, and a side frame stop 223, according to various embodiments disclosed herein. The direction 260 shown in FIGS. 2A and 2B points from outside the cabinet looking through the doorway inward. Direction 250 is the vertical direction pointing upward. The lower frame component 201 has a stop surface 209 that extends horizontally across the piece, and upward along the two arms 205 of the lower frame component 201. The top of the two arms 205 where the stop surface ends mates with the bottom of side frame stop 223. The stop surfaces on the sides, top and bottom are substantially planar—that is, they lie substantially in the same plane. In some embodiments the stop surfaces around the doorway are surfaces that the door directly closes against. In other various embodiments the stop surfaces are fitted with a flexible edging component that the door closes against. For the purposes of this disclosure the flexible edging component, upon being installed, is considered part of the stop surface. To aid in receiving the flexible edging component the stop surfaces are rounded at the corners where the stop surface transitions from a horizontal strip to a vertical strip.

Figure 2C:
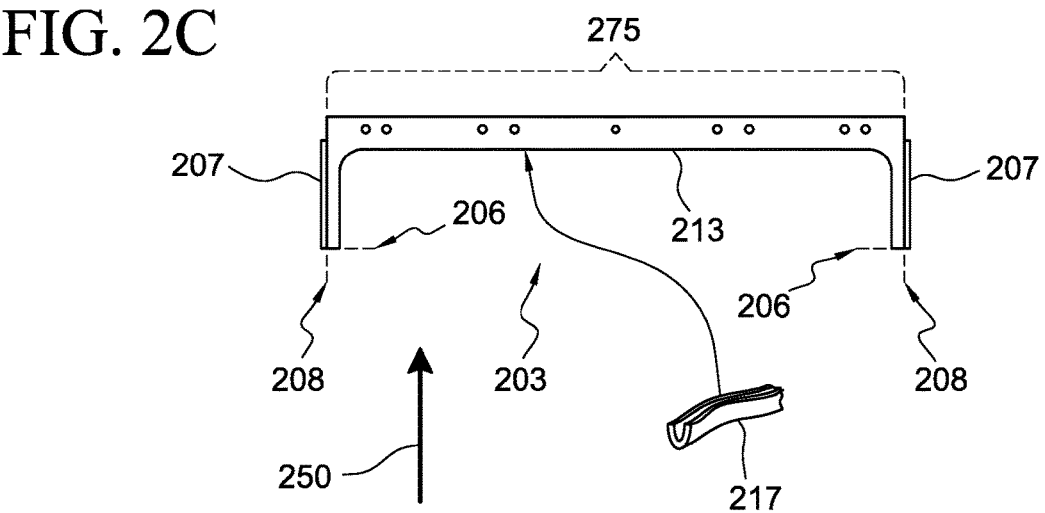
FIG. 2C depicts a top view of the upper frame stop component of FIG. 2B.

Turning to FIG. 2C, this figure depicts a front view of the upper frame component 203 as viewed in direction 260, that is, in the direction looking from outside the cabinet towards the inside of the cabinet. The upper frame component 203 has a stop surface 213. The stop surface 213 is fitted with a flexible edging component that the cabinet door closes against in the closed position. The bottom edge 206 of the stop surface mates with and is mounted on top of the top edge 224 of side frame stop 223.

Flexible edging component 217 shown in FIG. 2C is a portion of the flexible edging component used to encircle the door stop components. In various embodiments the flexible edging component 217 may be made from rubber, a rubber compound, neoprene, vinyl, silicone, or other like types of man-made or natural materials or composites as are known to those of ordinary skill in the art. The embodiment of the flexible edging component 217 shown in the figure has a U shaped cross-section that fits on the edge of the door stop components. In other embodiments a flat flexible edging component may be used on the door stop components rather than a U shaped flexible edging component 217. Flat flexible edging components are typically glued to the stop components of the doorway or affixed with double sided tape. An adhesive may be placed with the flexible edging component 217 as well to affix it to the door stop components around the door frame. In alternative embodiments the flexible edging component may be a flexible button either fastened to the door stop with an adhesive or inserted into a hole in the door stop.

FIG. 2B depicts the upper frame component 203. The upper frame component 203 has a frame stop surface 213 that extends across the piece and down to form two arms extending downward. The arms end in a bottom surface 206 that mates with and is mounted on top of a top surface of the side frame stop. This novel aspect of the various embodiments results in assemblies that are self fixturing. That is, upon being assembled the various components disclosed herein produce a door frame that has correct dimensions and angles without need for adjustment and tweaking. The self fixturing assemblies disclosed herein save a great deal of assembly labor. By contrast, conventional door frames nearly always require adjustment either during assembly or after the door frame has been completed. The upper frame component 203 and lower frame component 201 aid in creating a self fixturing assembly. If the upper and lower frame components 203 and 201 fit in the assembly of door frame components, the completed door frame will be self fixturing—that is, it will have the correct angles and dimensions so as to require no adjustment in order to receive a cabinet door of a predefined size. However, if a door frame assembly kit inadvertently includes components with dimensions or angles that are out of tolerance (e.g., the upper and lower frame components 203/201 are out of tolerance), then the component parts won't fit together and the door frame cannot be assembled—and the kit is not self fixturing.

In accordance with various embodiments the two tabs 207 on the arms of the upper frame component 203 are spaced apart to precisely fit on the outside surfaces of the left and right doorjamb beams. The inner doorjamb beam surfaces are adjacent to the side edges of the cabinet door in its closed position. The stops protrude inward from (or past) the inner doorjamb beam surfaces. The outer doorjamb beam surface is on the other side of the doorjamb beam from the inner doorjamb beam surface. The two inner tab surfaces 208 of upper frame component 203 mate with the two outer doorjamb beam surfaces to ensure that the doorjamb beams are the correct distance apart. This distance between inner surfaces 208 of tabs 207 is shown in FIG. 2C as predefined distance 275. The surfaces of the various components are depicted in further detail in FIGS. 3A-C.

Figure 3A:
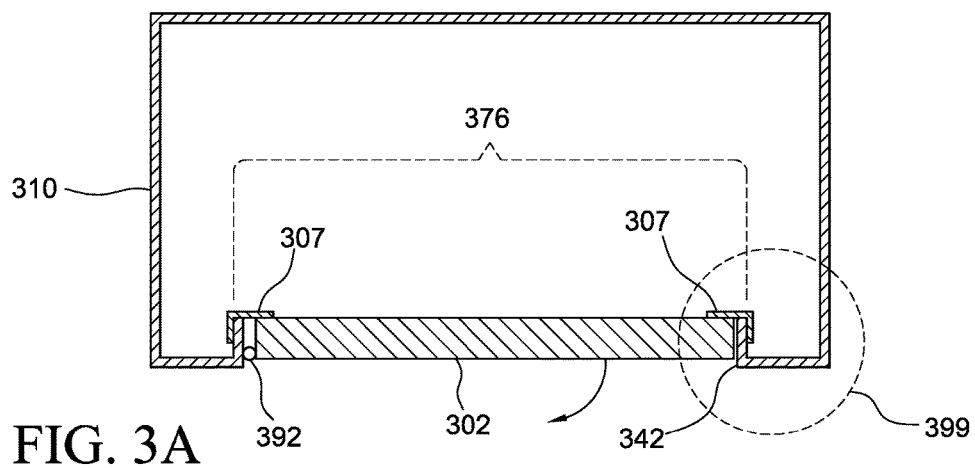
FIG. 3A depicts a cross-section view of a tool cabinet and door frame according to various embodiments disclosed herein.

FIG. 3A depicts a cross-section view of a tool cabinet 310 according to various embodiments disclosed herein. The tool cabinet 310 has a door 302 that swings outward on hinge 392. In FIG. 3A the hinge 392 is mounted on the left doorjamb beam (sometimes called a doorjamb post). In other implementations the hinge may be mounted on the right doorjamb beam so the door 302 can swing open from the left side. For both implementations—the hinge 392 being on the left or on the right—the lateral (side) edges of the door 302 are adjacent the inner surfaces of the two respective doorjamb beams.

In the closed position the door comes in contact with the stop component 307, or a flexible edging component that is inserted on the stop component 307, if the embodiment is so equipped. The stop component 307 may be configured as part of the upper frame component that defines the distance between the two side doojambs, for example, upper frame component 203 of FIGS. 2B-C. The stop component 307 is affixed securely to the doorjamb beam 341 as shown in FIGS. 3A and 3C. In various embodiments the stop component 307 may be configured as part of either upper frame component 203 or lower frame component 201 as shown in FIGS. 1A-B.

Figure 3B:
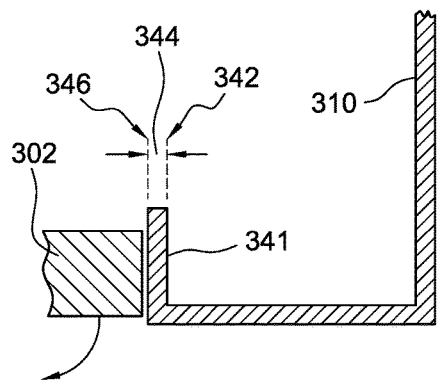
FIG. 3B depicts an enlarged portion of the tool cabinet door frame shown in FIG. 3A.
Figure 3C:
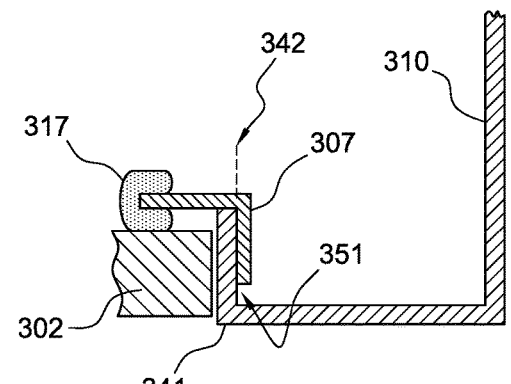
FIG. 3C depicts the view of FIG. 3B along with a cross-section view of a flexible edging component and stop component.

Turning to FIG. 3B, this figure depicts the enlarged portion of the right doorjamb of FIG. 3A contained within dotted line 399. In various embodiments the doorjamb beam 341 may be formed from the material used to make the cabinet 310, as shown in FIG. 3A. For example, in the embodiments of FIGS. 3A-C the doorjamb beam 341 is formed from the same metal (or other material) as the walls of tool cabinet 310. In other embodiments the doorjamb may be a separate component affixed to the walls of the enclosure, as discussed below in conjunction with FIG. 3E. As shown in FIG. 3B the doorjamb beam 341 has two lateral doorjamb surfaces—an inner doorjamb surface 346 and an outer doorjamb surface 342. The inner doorjamb surface 346 is adjacent the right lateral edge of door 302 when it is in the closed position. The outer doorjamb surface 342 is on the opposite side of the doorjamb beam 341 from inner doorjamb surface 346. The inner and outer doorjamb surfaces 346 and 342 are a distance apart equal to the lateral width of the doorjamb beam 341. In the closed position both lateral (right and left side) edges of the door 302 are adjacent to the respective inner doorjamb surfaces on each side of the door frame.

Figure 3D:
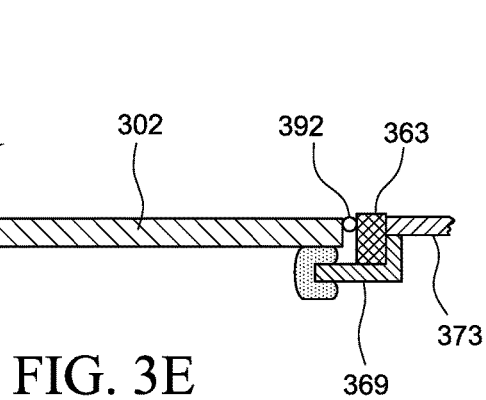
FIG. 3D depicts a cross-section view of a flexible edging component being placed on the stop component.

FIG. 3C depicts the right doorjamb of FIG. 3A with the addition of stop component 307 and flexible edging component 317 according to various embodiments disclosed herein. FIG. 3D shows the stop component 307 and flexible edging component 317 by themselves. The surface 353 of stop component 307 is the stop surface for the door—the surface that the door rests against in the closed position (or against a flexible edging component on the stop surface). The doorjamb beam 341, as shown in FIG. 3C, has an outer doorjamb surface 342 that mates with an inner lateral surface 351 of the stop component 307. On the other side of the doorway the left doorjamb has an outer lateral surface that mates with a surface of its stop component, as shown on the hinge side of the door 302 in FIG. 3A.

In various embodiments the right stop component 307 and the left stop component 307 are both part of the frame component—for example, either upper frame component 203 or lower frame component 201. In this way the lateral doorjamb beam width may be a tightly controlled predefined distance. The lateral doorjamb beam width is the distance between the outer lateral surface of the two doorjamb beams. The lateral doorjamb beam width is depicted in FIG. 3A as lateral doorjamb beam width 376. The lateral doorjamb beam width 376 coincides with predefined distance 275 so that the inner lateral surfaces of right and left stop components 307 fit around and mate with the inner and outer doorjamb surfaces 346 and 342. Having these dimensions of the doorjamb tightly controlled by a single component—e.g., upper frame component 203—results in the door frame components being self fixturing.

Figure 3E:
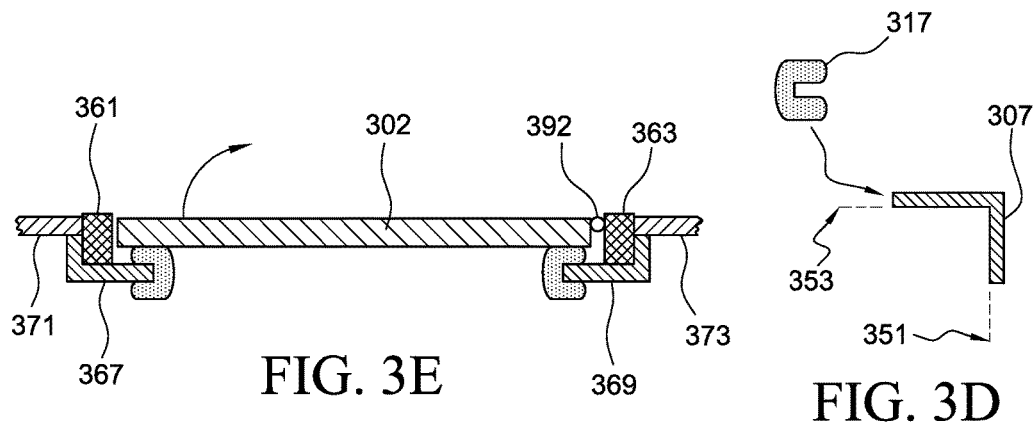
FIG. 3E depicts an implementation of a tool cabinet door frame with discrete doorjambs according to various embodiments disclosed herein.

FIG. 3E depicts an implementation of a tool cabinet door frame with discrete doorjamb beams 361 and 363 according to various embodiments disclosed herein. The various embodiments need not be implemented by fashioning the doorjamb from the same material as the walls of the cabinet, as is shown in FIGS. 3A-C. In various embodiments the doorjamb may be constructed from separate components affixed to the walls of the enclosure. FIG. 3E depicts a cross-section of the doorjamb beams 361 and 363 on either side of door 302. The doorjamb beams 361 and 363 are discrete components that are respectively attached to the walls 371 and 373.

FIG. 4A is a front view of an open cabinet door depicting the assembled components of the door frame. FIG. 4A shows upper frame component 403 which corresponds to the upper frame component 203 in FIG. 2B. The upper frame component 403 has a top stop surface 413 configured to receive a flexible edging component that the door rests against in the closed position. The upper frame component 403 has a tab 407, indicated by dashed lines, that bends around behind the doorjamb beam 441 and mates with the outer lateral surface of doorjamb beam 441 (which corresponds to doorjamb beam 341 in FIGS. 3A-C).

FIG. 4A also depicts the top rail 439 configured with drip ledge 440. Top rail 439 of FIGS. 4A-B corresponds to top rail 139 in FIG. 1B. The top rail 439 features a drip ledge 440 extending from the front side out over the door opening. The drip ledge 440 is generally positioned just high enough easily clear the door swinging open, but close enough to the top crack between the door and adjacent doorjamb to prevent water from entering. A top cover such as top cover 108 of FIG. 1A covers the full length of the top rail 439. The sides of the top rail 439 extend upward beyond the drip ledge 440 far enough to that the side pieces of the top cover 108 are positioned above the drip ledge 440. The lower side of top rail 438 serves as the top doorjamb surface 438, as shown in FIGS. 4A-B. The top rail 438 rests on top of the side doorjambs 441. The assembly of these components may be better understood by viewing FIG. 2B. The top rail 438 is adjacent the top stop surface 213 of upper frame component 203, extending in the direction 265 passing across the tops of tabs 207.

FIG. 4C depicts a corner gusset 461 according to various embodiments of the embodiments disclosed herein. The corner gusset 461 provides structural strength to the box assembly to aid in preventing the box assembly from twisting out of shape in the horizontal plane at the box floor. The corner gussets 461 are mounted inside the cabinet in the corners of the tool cabinet on the side in which the cabinet door is configured. The surface 423 fits against either the roof, the floor or a sidewall of the cabinet, depending on which corner the corner gussets 461 is mounted in. An adhesive or glue is used to fasten the corner gussets 461 to the cabinet walls. In addition, holes 429 are provided to receive mechanical fasteners such as rivets, screws, bolts or pins to further strengthen the connection between the corner gusset 461 and the cabinet walls.

Figure 5A:
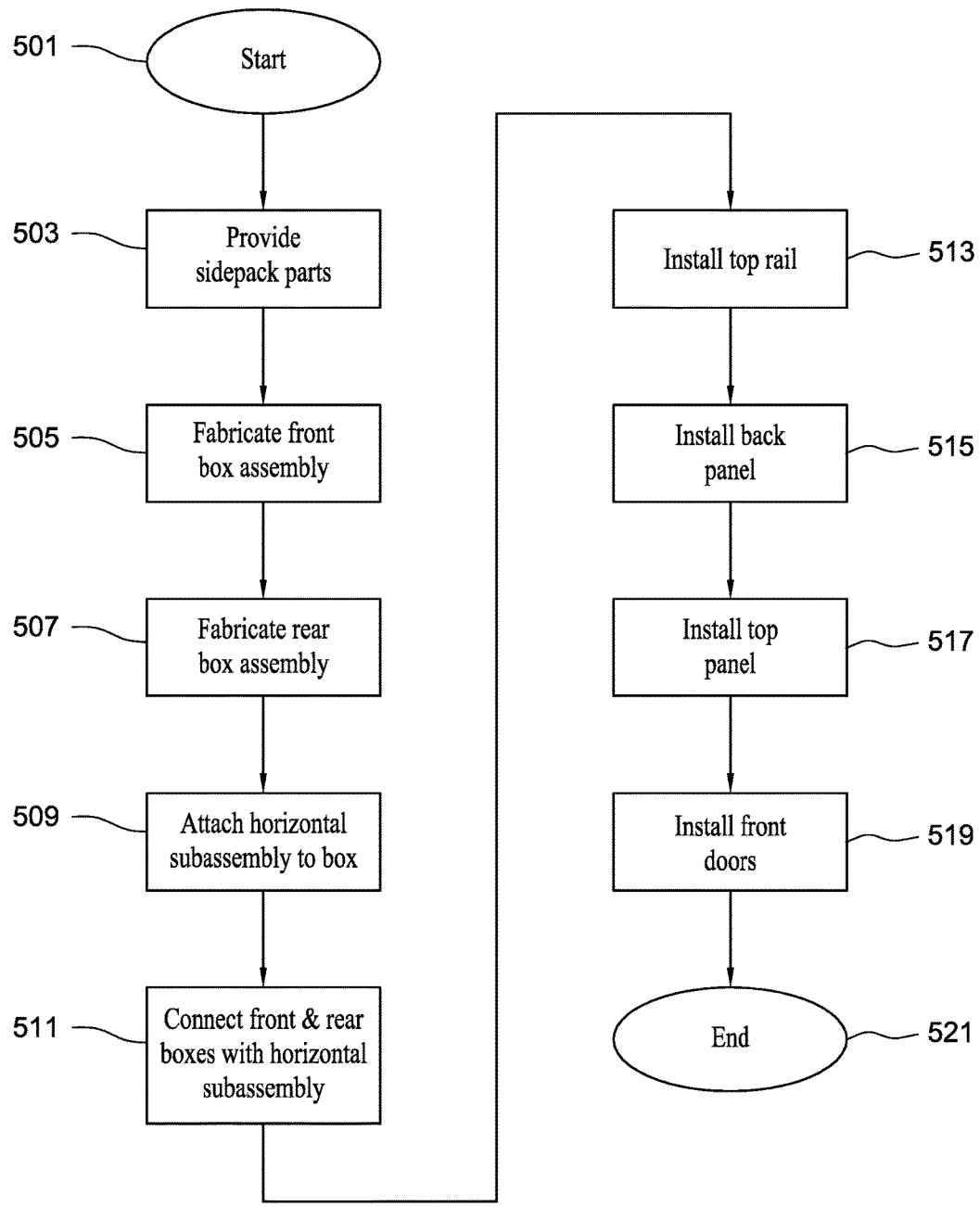
FIGS. 5A-B are flowcharts depicting a method of assembling a self fixturing sidepack for utility truck body according to various embodiments of the invention.

FIG. 5A is a flowchart depicting a method of assembling a self fixturing sidepack for utility truck body according to various embodiments of the invention. The method begins at block 501 and proceeds to block 503 where the sidepack parts are obtained. The sidepack parts include, among other things, the doors, upper and lower frame components, the side frame stop components, the corner gussets, the flexible edging components, the hinges, the doorjamb beams (which may be part of the cabinet box piece in some embodiments), the top rail, the cabinet top cover and the adhesives, rivets, bolts or other mechanical fasteners for fastening the pieces together. Once the sidepack components are provided in block 503 the method proceeds to block 505.

In block 505 the front cabinet assembly is fabricated, and in block 507 the rear cabinet assembly is fabricated. The method then proceeds to blocks 509 and 511 where the horizontal subassembly is attached to the front and rear cabinet assemblies. In block 513 the top rail is fastened in place, and in block 515 the back panel is installed. In block 519 the hinges are attached to their respective doorjamb beams and the front doors are installed. The method then proceeds to block 521 and ends.

Figure 5B:
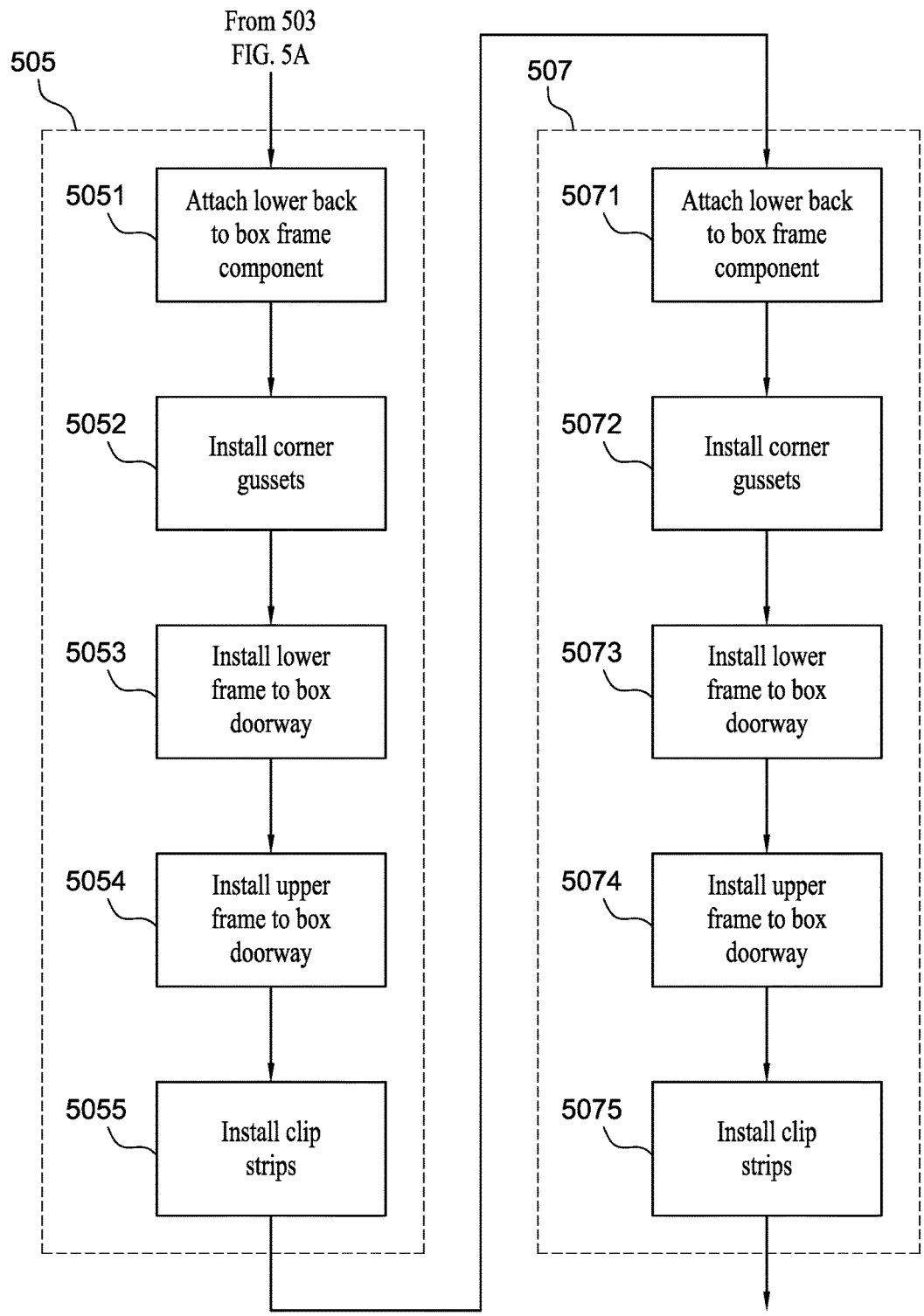

FIG. 5B is a flowchart depicting details of a method of performing blocks 505 and 507 to assemble the cabinet boxes of a self fixturing sidepack for utility truck body according to various embodiments of the invention. The method, coming from block 503, proceeds to block 5051 where the lower back piece is attached to the box frame component with adhesive, and in some embodiments, also with mechanical fasteners such as rivets, bolts into threaded holes, bolts and nuts, screws, pins, clamps or other like type of mechanical fastener as are known to those of ordinary skill in the art.

The method proceeds to block 5052 where the corner gussets are installed. The corner gussets are typically both glued and riveted into place to securely strengthen the sidepack cabinet assembly. Some embodiments use screws, bolts or other types of mechanical fasteners in place of rivets. In block 5053 the lower frame component is attached to the doorjamb beams of the doorway. In block 5054 the inner surfaces of the tabs of the upper frame component are attached to the doorjamb beams of the doorway with an adhesive. In block 5055 the clip strips are installed. Each clip strip has one or more series of slotted holes of the correct dimension to receive the inner parts of the cabinet such as drawers, shelves and the like. In various embodiments the clip strips are fastened using both adhesive and mechanical fasteners. Once fabrication of the front box assembly is completed (block 503) upon completing block 5055, the method proceeds to block 5071.

In block 5071 the lower back piece of the rear box assembly is attached to the box frame component with adhesive, and in some embodiments, with mechanical fasteners as well. The method proceeds to block 5072 where the corner gussets are installed. The corner gussets are both glued and affixed into place with mechanical fasteners to securely strengthen the sidepack cabinet assembly. In block 5073 the lower frame component is attached to the doorjamb beams of the doorway. In block 5074 the inner surfaces of the tabs of the upper frame component are attached to the doorjamb beams of the doorway with an adhesive. In block 5075 the clip strips are installed. Each clip strip has one or more series of slotted holes of the correct dimension to receive the inner parts of the cabinet such as drawers, shelves and the like. In various embodiments the clip strips are fastened using both adhesive and mechanical fasteners. Once fabrication of the front box assembly is completed (block 505) upon completing block 5075, the method proceeds to block 507 of FIG. 5A.

The flowchart and/or block diagrams in the figures help to illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur in an order other than that depicted in the figures. For example, two blocks shown in succession may, in fact, be executed substantially concurrently, or the blocks and activities of the figures may sometimes be executed in reverse order or in a different order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," and/or "including" used in this specification specify the presence of stated features, integers, steps, operations, elements, and/or components, but do not preclude the presence or addition of one or more other features, integers, steps, operations, elements, components, and/or groups thereof. The term "obtaining", as used herein and in the claims, may mean either retrieving from a computer readable storage medium, receiving from another computer program, receiving from a user, calculating based on other input, or any other means of obtaining a datum or set of data. The term "plurality", as used herein and in the claims, means two or more of a named element. It should not, however, be interpreted to necessarily refer to every instance of the named element in the entire device. Particularly, if there is a reference to "each" element of a "plurality" of elements.

There may be additional elements in the entire device that are not be included in the "plurality" and are not, therefore, referred to by "each."

The phrase "self fixturing" in regards to an assembly means that the components, upon being assembled, produce an assembly with correct dimensions and angles without need for adjustment or tweaking. In some embodiments, a "correct" dimension or angle is within 0.5% of a predetermined value (i.e., ½ of 1%). In other embodiments, a "correct" dimension or angle is within 0.25% of a predetermined value (i.e., ¼ of 1%). In yet other embodiments, a "correct" dimension or angle is within 0.125% of a predetermined value (i.e., ⅛ of 1%). The assembly of a conventional door frame is not self fixturing. Assembly of a conventional door frame requires a fair amount of adjustment and tweaking to get a particular sized door to fit properly within the door frame. The various method and apparatus embodiments of a self fixturing cabinet door frames disclosed herein aids in providing an assembled door frame within a predetermined size and angle tolerance without requiring adjustment or tweaking.

Various passages of the disclosure above mention affixing two or more pieces with glue. In practice any sort of adhesive fastener may be used in various embodiments, including for example, glue, adhesive tape, double sided adhesive tape or other like types of adhesive fastener known to those of ordinary skill in the art. Various passages of the disclosure above mention affixing two or more pieces with rivets or other mechanical fasteners. In practice any sort of mechanical fasteners may be used in various embodiments, including for example, rivets, bolts into threaded holes, bolts and nuts, screws, pins, clamps or other like type of mechanical fastener as are known to those of ordinary skill in the art. In some implementations it may be acceptable to replace certain mechanical fasteners with welding beads or spot welds. Fastening means includes any type of mechanical fasteners and/or adhesive fasteners.

For ease and accuracy in describing the various embodiments the directional terms "right," "left," "up" and "down" are used in this disclosure. These terms refer to the directions right, left, up and down as viewed from the perspective of looking towards the door configured to swing outward towards a user standing outside the door. The term "lateral" means from side to side, that is, left to right. Something positioned laterally adjacent to a component is positioned adjacent the component on either the left side or the right side. A "lateral edge" is a side edge of the component, not a top or bottom edge. The phrase "laterally outward" with respect to the door frame is in the direction outward from the door frame laterally away from the door—that is, towards the outside of the door frame. The phrase "laterally inward" with respect to the door flame is in the direction inward from the door frame—that is, to within the doorway. Further, the front of the door (or front surface) is the surface that swings outward relative to the doorway as the door opens. The front surface of the door frame components is on the same side as the front of the door. The back of the door or door frame components (or back surface) is the surface opposite the front of the door. The term "vertical" is defined by a line extending up from the center of the earth through the object. The "horizontal" direction is orthogonal to the vertical direction. The horizontal plane with respect to an assembled sidepack is defined by the top cover 108 depicted in FIG. 1A.

The terms "substantially planar" and the phrase "in substantially the same plane" mean that the specified surfaces of the components are flat with respect to each other within the practical limits of human construction standards. It would be impossible for two man-made metal components to be exactly planar in a mathematical sense. Therefore, for the purposes of this disclosure four points are to be considered "substantially planar" or "in substantially the same plane" so long as none of the four points are outside of the mathematical plane defined by the other three points by more than plus/minus 2.5% of the furthest distance to any of the other three points.

A tool cabinet is a cabinet with a doorway configured to receive and store tools, supplies or other materials. Tool cabinets are often shaped like boxes with adjacent walls positioned at right angles to each other. However, at least some of the various embodiments disclosed herein may be constructed with walls that are angled at other than right angles to each other—e.g., with some wall intersections being at acute angles and others being at obtuse angles. A tool cabinet sidepack, sometimes known simply as a "sidepack", is an assembly of two or more cabinets configured to be mounted on the side of a utility truck body with the cabinet doors facing outward.

The upper frame component, for example, upper frame component 203, is discussed in terms of being a single component. In practice it is possible to fashion an upper frame component from two or more pieces fastened together. In such instances, the upper frame component is considered a single component for the purposes of this disclosure so long as the two or more pieces are fastened together into the upper frame component before the upper frame component is assembled into the door frame. The various components of the utility truck self fixturing sidepack cabinets may be fabricated from one or more of aluminum, iron, steel or other types of metal, from wood, or from polyvinyl chloride (PVC), polyethylene terephthalate (PET) or other types of plastic or man-made composites.

The various embodiments describe doors that swing outward, for example cabinet doors, doors on a box, a storage unit or other enclosure. Some embodiments may be implemented on larger enclosures such as travel campers, houses, buildings or the like. Such embodiments may, or may not, have a bottom door stop—that is, the door frame component that the door rests against in the closed position, or the component that receives a flexible edging component for the door to rest against. Moreover, in such embodiments implemented on larger structures such as houses, buildings or the like, the door may be configured to swing inward rather than outward. In such inward swinging embodiments the directional terms right, left, up and down still refer to the door and door frame components as viewed from the perspective of a user standing near the door and opening it towards him, that is, inward for an inward swinging door.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and gist of the invention. The various embodiments included herein were chosen and described in order to best explain the principles of the invention and the practical application, and to enable others of ordinary skill in the art to understand the invention for various embodiments with various modifications as are suited to the particular use contemplated.

What is claimed is:

1. A cabinet door frame configured to receive a cabinet door, the cabinet door frame comprising:
    a right doorjamb beam comprising a right inner doorjamb surface and a right outer doorjamb surface, the right inner doorjamb surface being adjacent a first lateral edge of the cabinet door in a closed position;
    a left doorjamb beam comprising a left inner doorjamb surface and a left outer doorjamb surface, the left inner doorjamb surface being adjacent a second lateral edge of the cabinet door in the closed position;
    an upper frame component comprising a first surface configured to be attached to the right outer doorjamb surface, the upper frame component further comprising a second surface configured to be fastened to the left outer doorjamb surface;
    a first bottom surface of the upper frame component mounted on top of a first component fastened to the cabinet door frame; and
    a second bottom surface of the upper frame component mounted on top of a second component fastened to the cabinet door frame.

2. The cabinet door frame of claim 1, wherein the upper frame component comprises a flat surface extending laterally across the upper frame component, a portion of the flat surface comprising an upper stop surface spanning a horizontal direction and extending at least 3/16 of an inch in a vertical direction below a top doorjamb beam.

3. The cabinet door frame of claim 2, further comprising:
    a left side stop component with a left stop surface extending at least 3/16 of an inch laterally inward from an edge of the left inner doorjamb surface, the left side stop component having a first top surface.

4. The cabinet door frame of claim 3, further comprising:
    a right side stop component with a right stop surface extending at least 3/16 of an inch laterally inward from an edge of the right inner doorjamb surface, the right side stop component having a second top surface.

5. The cabinet door frame of claim 4, wherein the left side stop component is said first component, the first bottom surface of the upper frame component being mounted on first top surface of the left side stop component.

6. The cabinet door frame of claim 5, wherein the right side stop component is said second component, the second bottom surface of the upper frame component being mounted on second top surface of the right side stop component.

7. The cabinet door frame of claim 2, further comprising:
    a first upper frame arm extending downward from the flat surface of the upper frame component, the first upper frame arm comprising a first bottom surface;
    a second upper frame arm extending downward from the flat surface of the upper frame component, the second upper frame arm comprising a second bottom surface.

8. The cabinet door frame of claim 7, further comprising:
    a first stop surface configured as part of the first upper frame arm; and
    a second stop surface configured as part of the second upper frame arm, the first stop surface and the second stop surface being substantially planar with both the right stop surface and the left stop surface.

9. The cabinet door frame of claim 1, wherein the cabinet door frame is a first cabinet door frame of a first cabinet among a plurality of cabinets including a last cabinet, the plurality of cabinets being fastened together as part of a sidepack configured to be mounted on a utility truck.

10. The cabinet door frame of claim 9, wherein the sidepack comprises a top cover configured to ensure horizontal squareness of the plurality of cabinets in response to being fastened to the sidepack; and
    wherein the sidepack comprises a horizontally oriented top rail spanning from the first cabinet to the last cabinet.

11. A method of constructing a cabinet door frame configured to receive a cabinet door, the method comprising:
    providing a right doorjamb beam comprising a right inner doorjamb surface and a right outer doorjamb surface, the right inner doorjamb surface being adjacent a first lateral edge of the cabinet door in a closed position;
    providing a left doorjamb beam comprising a left inner doorjamb surface and a left outer doorjamb surface, the left inner doorjamb surface being adjacent a second lateral edge of the cabinet door in the closed position;
    attaching an upper frame component comprising a first surface to the right outer doorjamb surface, the upper frame component further comprising a second surface configured to be attached to the left outer doorjamb surface;
    mounting a first bottom surface of the upper frame component on top of a first component fastened to the cabinet door frame; and
    mounting a second bottom surface of the upper frame component on top of a second component fastened to the cabinet door frame.

12. The method of claim 11, wherein the upper frame component comprises a flat surface extending laterally across the upper frame component, a portion of the flat surface comprising an upper stop surface spanning a horizontal direction and extending at least 3/16 of an inch in a vertical direction below a top doorjamb beam.

13. The method of claim 12, further comprising:
    providing a left side stop component with a left stop surface extending at least 3/16 of an inch laterally inward from an edge of the left inner doorjamb surface, the left side stop component having a first top surface.

14. The method of claim 13, further comprising:
    providing a right side stop component with a right stop surface extending at least 3/16 of an inch laterally inward from an edge of the right inner doorjamb surface, the right side stop component having a second top surface.

15. The method of claim 14, wherein the left side stop component is said first component, the first bottom surface of the upper frame component being mounted on first top surface of the left side stop component.

16. The method of claim 15, wherein the right side stop component is said second component, the second bottom surface of the upper frame component being mounted on second top surface of the right side stop component.

17. The method of claim 13, further comprising:
    providing a first upper frame arm extending downward from the flat surface of the upper frame component, the first upper frame arm comprising a first bottom surface;
    providing a second upper frame arm extending downward from the flat surface of the upper frame component, the second upper frame arm comprising a second bottom surface.

18. The method of claim 17, further comprising:
    configuring a first stop surface as part of the first upper frame arm; and
    configuring a second stop surface configured as part of the second upper frame arm, the first stop surface and the second stop surface being substantially planar with both the right stop surface and the left stop surface.

19. The method of claim 11, wherein the cabinet door frame is a first cabinet door frame of a first cabinet among a plurality of cabinets including a last cabinet, the plurality of cabinets being fastened together as part of a sidepack configured to be mounted on a utility truck.

20. The method of claim 19, wherein the sidepack comprises a top cover configured to ensure horizontal squareness of the plurality of cabinets in response to being fastened to the sidepack; and wherein the sidepack comprises a horizontally oriented top rail spanning from the first cabinet to the last cabinet.

\* \* \* \* \*